UNITED STATES PATENT OFFICE.

ALBERT WOLFF, OF BERLIN, GERMANY.

PROCESS OF PREPARING A SOLUTION OF PEROXID OF HYDROGEN WITH A HIGH CONTENT OF OZONE AND OXYGEN.

1,152,066.     Specification of Letters Patent.     Patented Aug. 31, 1915.

No Drawing.     Application filed February 25, 1915. Serial No. 10,624

*To all whom it may concern:*

Be it known that I, Dr. ALBERT WOLFF, a subject of the Emperor of Germany, and residing at Berlin, Germany, have invented certain new and useful Improvements in Processes of Preparing a Solution of Peroxid of Hydrogen with a High Content of Ozone and Oxygen, of which the following is a specification.

It is a well known fact that peroxid of hydrogen, suitably diluted, is an excellent disinfectant, which is used for various purposes, for example for cleansing purulent wounds, for disinfecting the mouth and the teeth and the like.

The disinfecting effect lies chiefly in the fact that when the said solution comes into contact with the mucous membranes, or with purulent or decomposing substances, oxygen is liberated, which kills the bacteria or loosens the diseased parts and thereby facilitates their removal. This effect might, therefore, be considerably increased if the solution could be enriched in an effective and lasting manner with ozone and oxygen. But heretofore it has not been possible to produce a solution thus enriched.

According to the present invention such solution may be obtained by the following process: To an at least 3 per cent. chemically pure solution of peroxid of hydrogen 0.7–0.8% of common salt is added. Thereupon oxygen is passed at a temperature of about 0 to 2° cent. in a suitable manner, for example by aid of an oxygen pump, through this mixture. This should last for about 2 to 3 minutes per liter of the solution. Thereupon the solution is conducted in a spray through a chamber filled with compressed ozone, whereby the solution is also enriched with ozone. Of course, also any other suitable means may be employed instead of the spraying arrangement, for enriching the solution with ozone.

In consequence of the addition of common salt, and in particular owing to the low temperature of about 0–2° cent. the original solution is enriched in a far more effective manner with oxygen and ozone than this was hitherto possible by other known processes.

The stock solution thus obtained is extremely lasting and should be stored in well stoppered bottles, preferably up to the moment of use. When a part of the solution has been used, so that the respective bottle is no more quite full, the empty space in the bottle is filled with ozone, so that in case any ozone or oxygen should have been liberated, this loss will be compensated.

For use the stock solution is diluted with water at a rate of 1:3, and forms an excellent disinfectant, for example, for rendering bad meat again eatable and serviceable. For this purpose the meat is washed, if necessary repeatedly, in the solution, without, however, letting it rest therein.

By the liberation of oxygen the germs on the surface are quickly oxidized. The germs contained in raw meat thus treated are but very few and not able to cause decomposition which generally proceeds from outside toward inside of the meat. Meat which has thus been freed of germs will last very long and better than on ice, if kept in germfree or at least germpoor air, which contains as little water as possible.

The process of decomposition thus inhibited can be started afresh only by a fresh deposit of germs from the air. In so far the treatment of meat with the new disinfectant is no permanent conservation, but merely a freshening up of the meat, and delays the process of decomposition for a given time. This freshening up and freeing of germs is apparent, beside a bacteriological examination, also visually by the returning of a fresh, red color of the meat which had previously turned a blue and green color, and by the rapid disappearance of all decomposition odor.

Having thus described the invention what is claimed is:

1. Process of preparing a solution of peroxid of hydrogen with a high content of ozone and oxygen, consisting in an at least 3-per cent. chemically pure solution of peroxid of hydrogen being mixed with about 0.7–0.8% of common salt, whereupon this mixture is saturated at a temperature of about 0–2° cent. with oxygen and then saturated with ozone.

2. Process of preparing a solution of peroxid of hydrogen with a high content of ozone and oxygen, consisting in an at least 3-per cent. chemically pure solution of peroxid of hydrogen being mixed with about 0.7–0.8% of common salt, whereupon this mixture is saturated at a temperature of about 0–2° cent. with oxygen and then sprayed through a chamber containing compressed ozone.

In testimony whereof I affix my signature in presence of two witnesses.

Dr. ALBERT WOLFF.

Witnesses:
G. F. STOPPEN,
ALFRED MEYER.